United States Patent [19]

Ohlenforst et al.

[11] Patent Number: 4,488,141
[45] Date of Patent: Dec. 11, 1984

[54] GLASS PANE FOR AN AUTOMOBILE REAR VIEW WINDOW

[76] Inventors: Hans Ohlenforst, Im Johannistag 71; Werner Gatzweiler, Schutzenstrasse 12, both of D-5100 Aachen, R.F.A., Fed. Rep. of Germany

[21] Appl. No.: 288,805

[22] Filed: Jul. 31, 1981

[30] Foreign Application Priority Data

Aug. 27, 1980 [DE] Fed. Rep. of Germany ....... 3032245

[51] Int. Cl.³ .......................... B60Q 1/00; B60B 9/08
[52] U.S. Cl. .......................................... 340/97; 340/84; 340/87; 340/66; 340/69; 156/99; 296/84 R; 427/287
[58] Field of Search ............... 340/97, 87, 84, 66, 340/69; 362/125; 156/99; 427/287, 282; 296/84 R

[56] References Cited

U.S. PATENT DOCUMENTS

| 2,675,534 | 4/1954 | Bryant | 340/97 |
| 3,317,906 | 5/1967 | Baldridge | 296/84 R |
| 3,665,392 | 5/1972 | Annas | 340/97 |

FOREIGN PATENT DOCUMENTS

| 1922364 | 8/1965 | Fed. Rep. of Germany. | |
| 7001884 | 8/1972 | Fed. Rep. of Germany. | |
| 2641154 | 7/1978 | Fed. Rep. of Germany | 340/97 |
| 3004457 | 8/1981 | Fed. Rep. of Germany. | |

Primary Examiner—Donnie L. Crosland

[57] ABSTRACT

Glass pane for an automobile rear window where the pane has an electric signal light unit rigidly fixed thereto.

6 Claims, 9 Drawing Figures

GLASS PANE FOR AN AUTOMOBILE REAR VIEW WINDOW

TECHNICAL FIELD

The invention relates to a glass pane for an automobile window and more particularly to a rear view window.

BACKGROUND OF THE INVENTION

Signal lights, particularly brake lights, have been mounted in automobiles so as to be readily visible through a rear view window by the drivers of following automobiles. Such lights have been mounted by support rods or other devices so as to be positioned a substantial distance from the pane of glass comprising the rear view window. Such mountings have been unattractive, relatively complicated in structure and often limited the field of vision through the rear window.

It is therefore an object of the invention to provide for a glass pane having a signal light unit rigidly mounted thereon which will be attractive, not unnecessarily restrict the field of vision, and which, at the same time, will provide signals readily observable by the drivers of following vehicles.

DISCLOSURE OF INVENTION

According to the invention, signal light units are mounted directly at the desired level on the glass pane such that the pane provides the support for the unit. Steps are taken during the manufacture of the pane to provide means for fastening signal light units to the pane where the means connect directly with the glass pane or with other parts fastened to the pane.

Light units constructed according to the invention are made and connected as brake lights with the units having covers comprising a painted plastic body or a colored glass forming a reflecting prism. The units can be mounted as a supplement to the conventional existing fender or bumper mounted brake and backup lights or can completely take over the function of the conventional lights to provide tail light, brake light, blinking light and if applicable, backup light signals all mounted on the pane forming the rear view window. Light units can also be mounted in the body frame of the automobile framing the sides of the rear view window in which event the pane of the rear window extends in front of the bulbs of the units and where the bulbs are provided with colored covers.

In one embodiment of the invention, the complete light unit is fastened to a pane by holes extending through the pane. In one preferred form of the invention, the light unit is made in two parts so that a colored cover may be placed on an outer facing surface of the pane while a housing for the unit is mounted on an inner facing surface of the pane. The two parts forming the unit can be connected to one another directly or through one or more holes that extend through the panes. Further the two parts may be connected one to each of the inner and outer surfaces of the pane whereby light rays from the bulb of the signal unit pass through the pane.

The signal light units are preferably positioned in the upper corners of the pane forming a rear window. By this means, signals will be observable by drivers through several following vehicles.

Conductive strips are printed on and baked on the glass panes to provide electric supply conductors to the signal light units. The conductive strips are positioned on the edge of the panes so that, if necessary, they may be partially or completely covered by rubber molding encircling the pane. Use of conductive strips allows a unit to be electrically connected to an electrical source at various positions on a pane. Connection between the strips and the units themselves can be achieved by using connecting terminals soldered on the conductive strips and on which a connecting cable is plugged or contact pins on a housing for the unit may be brought into contact with the strips to provide a connection when the strips are edge mounted on the pane. Mounting of the conductive strips and their connection with the signal lights of the units may be made in the manner described in German Pat. No. P 30 04 457.6.

It is an advantage that the panes constructed according to the invention be provided with electrical resistance heating conductors that are baked onto the pane. These heating conductors may be printed onto a surface of the pane in the same manner that the electrical strips are printed and both may be baked onto the pane during any further heat treating process which involves bending and/or tempering of the glass pane.

BEST MODE FOR CARRYING OUT THE INVENTION

Figure 1:
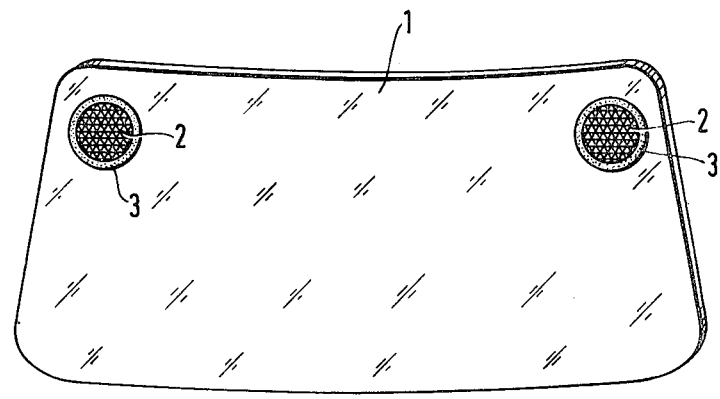
FIG. 1 is an overall view of a rear window formed of a glass pane constructed according to the invention having two signal light units.

Referring to the figures in which like parts have the same identifying numerals and in particular to FIG. 1, there is illustrated a glass pane 1 constructed according to the invention in the form of a rear view window in its simplest basic embodiment. Pane 1 is a silicate glass made in the form of a safety glass, i.e., a tempered one-layer safety glass or a multilayer glass known as laminated safety glass. Usually rear windows are provided with electric heating elements to clear the field of vision or keep it clear in case of formation of fog or frost. For greater simplicity, the panes forming the rear windows illustrated in the drawings are shown without these heating elements.

A signal light unit 2 is installed in the area of each upper corner of the glass pane at a relatively slight distance from the edges of the pane. The only part of the unit that is visible from the outside is a colored cover provided with reflecting prisms. A border 3 made of an opaque paint hardened by baking is provided on the surface of the pane. Signal units 2 are in the form of simple lights and can be used as additional brake lights in which case they are connected in parallel with conventional brake lights placed lower on the body of an automobile.

Figure 2:
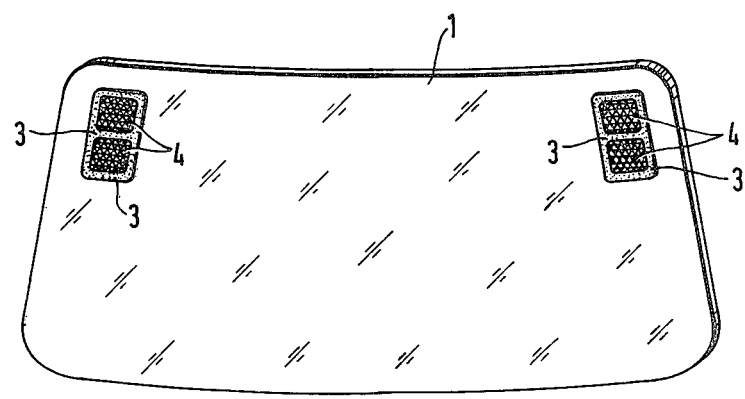
FIG. 2 is a view similar to FIG. 1 where each signal light unit has two signal lights.

FIG. 2 illustrates a pane 1 of silicate glass which has, in each of its upper corner areas, a combined mounting or unit 4 of two signal lights. The two lights and their cover, which, of course, can form a monolithic element, are superposed in the embodiment shown. However the combined light mount can also, of course, comprise lights placed side-by-side in a horizontal line. The light units 4 are surrounded by a border 3 as in FIG. 2 which is made up of an opaque paint hardened by baking and which is baked on the surface of pane 1.

Figure 3:
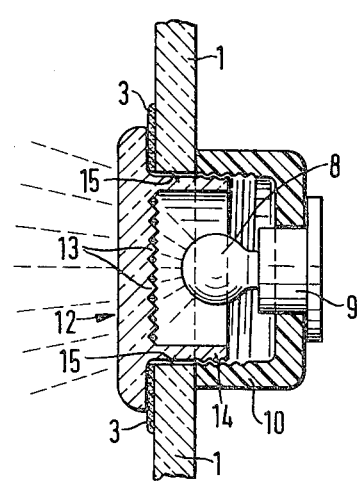
FIG. 3 is a sectional view of a pane according to the invention illustrating one embodiment of a signal unit and means for attachment to a pane.

A first embodiment of a signal light unit made and installed according to the invention is shown in FIG. 3. The unit is made up of two parts, namely, a housing 10 which carries bulb 8 and bulb socket 9, and a cover 12 forming a colored cover plate. Cover 12 is made up of a transparent plastic or a colored transparent glass at least in the zone that forms the cover transparent to light rays. The cover 12 is provided on its back face with an impression forming reflecting prism 13. Cover 12 further has an annular projection 14 which is placed in a hole 15 in glass pane 1 to extend through the pane to provide a means by which the housing 10 may be fastened to the cover 12. Fastening of projection 14 to housing 10 can be achieved by a clamping effect or by a screw thread as shown in the example of FIG. 3. A border 3 made of an opaque paint hardened by baking is placed on the outside surface of glass pane 1 to surround the hole 15.

Figure 4:
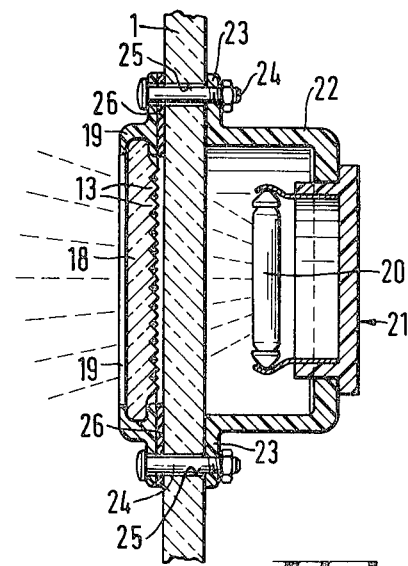
FIG. 4 is a view similar to FIG. 3 illustrating a second embodiment of a signal unit and means for attachment to a pane.

Another embodiment in which the signal light unit is also fastened by holes provided in the glass pane is shown in FIG. 4. In this case, the light unit is made in two parts, namely a covering part placed on the outer facing surface of the pane and comprising a colored cover 18 and a frame 19 encircling the cover 18 and a housing 22 carrying a bulb 20 and its socket 21 which is placed on the inner facing surface of the glass pane. Housing 22 is provided with an annular projection 23 and this projection is fastened to housing 19 encircling cover 18 by screws 24 which extend through holes 25 in glass pane 1. A gasket 26 is made of an elastic fluid-tight material is provided between frame 19 and pane 1.

Figure 5:
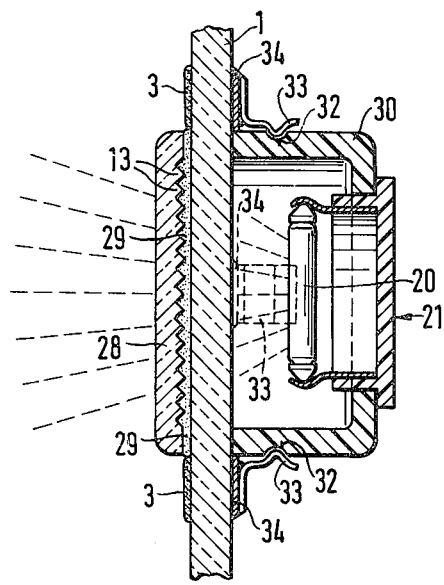
FIG. 5 is a view similar to FIG. 3 illustrating a third embodiment of a signal unit and means for attachment to a pane.

Another embodiment in which a light cover is placed on one side of the glass pane and the housing on the other side of the glass pane is shown in FIG. 5. In this embodiment, no hole is necessary in the glass pane 1 and a cover 28 of plastic or transparent colored glass is joined flat to glass pane 1 by a transparent adhesive layer 29.

The reflecting or deviation prisms of cover 28 are on the side adjacent the glass pane in the embodiment shown. As a variant, the prisms could be provided on the outer free surface of the cover. Further, the prisms can be shaped and arranged to cause the light rays coming from the bulb to deviate in a preferred direction. This feature is especially useful when the rear window is mounted so as to have a considerable angle of slope whereby the prisms may assure that the light rays are deviated in the horizontal direction.

Polyvinylbutyral or a polyurethane base adhesive, for example, can be used as the transparent adhesive for gluing cover 28 to the surface of the glass pane. Cover 28 is surrounded by a border 3 made of an opaque paint hardened by baking during the process of making the glass pane. Housing 30 is placed on the other side of glass pane 1 and contains bulb 20 and bulb socket 21. Light housing 30 is fastened by clamping to the pane and for this purpose the housing is provided with ratchet grooves 32 which are engaged by elastic clips 33. Elastic clips 33 are soldered to a layer 34 of metal coating provided on pane 1. Layers 34 can comprise the same composition utilized in providing heating elements of heated rear windows.

In principle, the light unit housings can also be mounted directly to the frame of the automobile body at the lateral sides of the rear window. In this case, no rigid connection is provided between the housing and glass pane and the glass pane is simply placed in front of the lights or reflectors so that covers 28 are in front of the lights. In this case, these conditions have to be considered, if applicable, during building of the body of the vehicle because generally the glass panes are extended laterally and the shape of the body of the vehicle should be adapted thereto.

Figure 6:
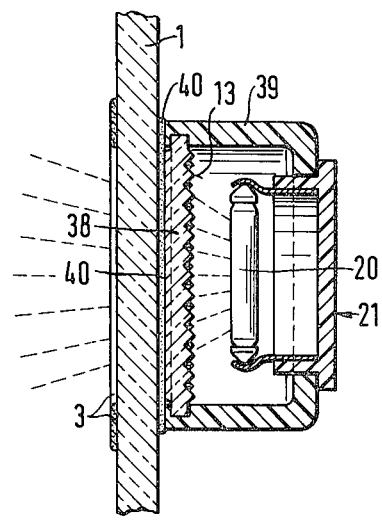
FIG. 6 is a view similar to FIG. 3 illustrating a fourth embodiment of a signal unit and means for attachment to a pane.

According to the embodiment shown in FIG. 6, it is also possible to make the signal light units as a single piece by gluing colored cover 38, which is fastened in or to light housing 39 by a transparent adhesive layer 40, to the inner facing surface of glass pane 1 directed toward the inside of the vehicle. Again it is possible to use a transparent polyvinylbutyral or polyurethane adhesive. A border 3 of an opaque paint hardened by baking is again provided on the outer surface of the glass pane which is directed toward the outside of the vehicle. Instead of using a transparent adhesive in the embodiment shown in FIG. 6 it is also possible to glue only the edge portion of the housing 39 by means of another usual adhesive which can be opaque.

Figure 7:
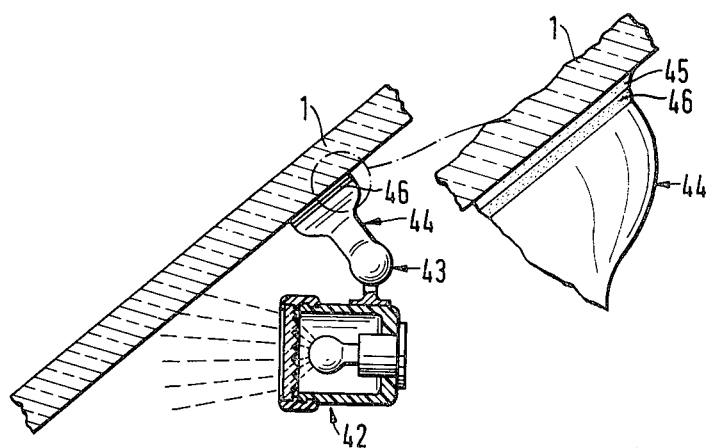
FIG. 7 is a view of a fifth embodiment of a signal unit and means for attachment to a pane.

FIG. 7 shows an embodiment of the invention that is particularly suitable for rear windows having a high degree of slope or a high degree of curvature. In this case, signal light 42 is provided with a support foot 44 having a swivel or ball joint 43 which is fastened on glass pane 1. Fastening of the swivel to the pane can be done by known techniques, as those which, for example, are used to fix rear view mirrors on the inside face of the windshield. In the case shown, glass pane 1 is provided in the zone in which it is connected to the support foot with a coat 45 of an opaque enamel hardened by baking during the process of bending and/or tempering the glass pane. This coat 45 acts, on the one hand, to protect adhesive layer 46 from direct sun rays, in particular from UV rays, and, on the other hand, to camouflage the glued spot. In this embodiment, the signal light itself can be aimed in a desired direction regardless of the shape and mounting position of the rear window.

Figure 8:
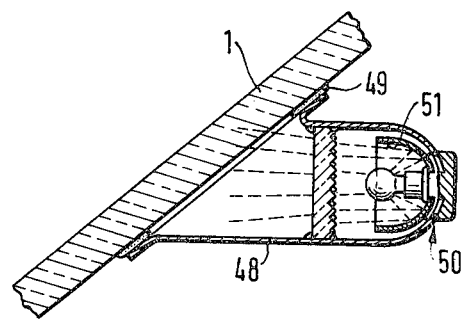
FIG. 8 is a view of a sixth embodiment of a signal unit and means of attachment to a pane; and, FIG. 9 is a view of a seventh embodiment of a signal unit and means of attachment to a pane.

FIG. 8 shows a further embodiment in which housing 48 of the signal light unit is again joined to glass pane 1 by an adhesive layer 49. The housing 48 is provided with a pivotal bulb socket 50 which, by a parabolic reflector 51 provided on the inside face of pivotal socket 50, allows aiming of the light rays in a desired direction.

Figure 9:
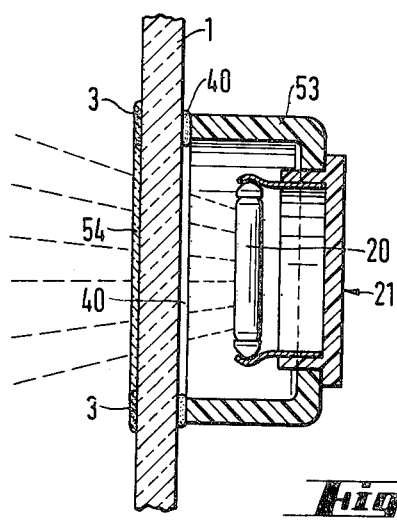

It is particularly advantageous to replace the colored cover with a colored transparent filtering layer provided immediately on the surface of the glass pane. In this manner it is possible either to eliminate the cover entirely or, if necessary, to use an uncolored cover which is considerably less expensive than a colored cover. Such an embodiment is shown in FIG. 9. In this case, the unit to be applied on the glass pane simply comprises a bulb housing 53 with bulb 20 and bulb socket 21 therein which is joined to glass pane 1 by an adhesive layer 40. A border 3 made of an opaque enamel hardened by baking is placed on the opposite side of the pane from the housing 53. A transparent layer 54 of enamel, particularly red or yellow, is provided on the inside of the border. These two layers are printed by silk screening on the glass blank and are melted or baked on the glass surface during bending and/or tempering of the glass pane.

In all the embodiments of the invention described, the fact must be remembered that the steps necessary for fixing and/or placing the border have already been taken during making of the glass pane, i.e., before heat treatment necessary for bending or tempering the glass pane. In other words, the holes for fastening the light units should be made and the printing materials for the borders and metal layers for mounting the fastening clips or other fastening means should already be applied before heat treatment of the glass pane because, on the one hand, it is no longer possible to drill a tempered glass and, on the other hand, the layers of paint hardened by baking or the layers applied by metal coating are baked during heating for the bending or tempering process.

In most of the embodiments of the invention described it is also possible to renounce the cover and to form the reflecting prisms immediately on the surface of the glass pane itself. The forming or shaping of the prisms can be acheived by stamping the heated glass pane during the bending process. For example the embodiment shown in FIG. 9 can be completed by reflecting or deviating prisms directly on the inner surface of the glass pane 1 opposite to the colored layer 54.

We claim:

1. Glass pane for an automobile rear view window having an electric signal light unit rigidly attached thereto, said light unit comprising a colored cover and a bulb housing with said housing being attached to said pane, and said pane having a hole extending therethrough by which said unit is attached to said pane, wherein said cover engages a surface of said pane adapted to face the outside of the automobile and said housing engages a surface of said pane adapted to face the interior of the automobile with said cover being attached to said housing by fastening means extending through said hole.

2. Glass pane according to claim 1 wherein said hole corresponds to the light field of said light unit and wherein said cover has an annular projection extending through said hole and connecting with the housing.

3. Glass pane according to claim 1 wherein said cover includes a frame and having in addition a screw extending through a hole in the pane and connecting the frame with said housing.

4. Glass pane for an automobile rear view window having an electric signal light unit rigidly attached thereto, said light unit comprising a colored cover and a bulb housing with said housing being attached to said pane wherein said cover is glued to a surface of said pane adapted to face the outside of an automobile and said housing is attached to a surface of said pane adapted to face the interior of an automobile.

5. Glass pane according to claim 4 having in addition a metal coating on the pane and elastic clips soldered to the coating with said clips adapted to fasten said housing to said pane.

6. Glass pane according to claim 4 wherein said housing is glued to said pane.

* * * * *

UNITED STATES PATENT AND TRADEMARK OFFICE
CERTIFICATE OF CORRECTION

PATENT NO.  : 4,488,141

DATED       : December 11, 1984

INVENTOR(S) : Hans Ohlenforst et al.

It is certified that error appears in the above-identified patent and that said Letters Patent is hereby corrected as shown below:

Title Page:  Item for Assignee should read --Saint Gobain Vitrage, Neuilly-sur-Seine, France--.

Signed and Sealed this

Nineteenth Day of November 1985

[SEAL]

Attest:

DONALD J. QUIGG

Attesting Officer

Commissioner of Patents and Trademarks